United States Patent [19]

Whitlock

[11] Patent Number: 5,599,381
[45] Date of Patent: Feb. 4, 1997

[54] SEPARATION OF SOLUTES IN GASEOUS SOLVENTS

[76] Inventor: David R. Whitlock, 138 Vassal La., Cambridge, Mass. 02138

[21] Appl. No.: 478,200

[22] Filed: Jun. 7, 1995

Related U.S. Application Data

[63] Continuation of Ser. No. 27,890, Mar. 8, 1993, Pat. No. 5,470,377.

[51] Int. Cl.$^6$ .................................................. B01D 53/04
[52] U.S. Cl. ................................ 95/90; 95/106; 95/141; 95/145; 95/148
[58] Field of Search ................................ 95/1, 8, 14, 90, 95/95, 106, 114, 115, 141, 143–148

[56] References Cited

U.S. PATENT DOCUMENTS

| | | | |
|---|---|---|---|
| 1,382,889 | 6/1921 | Burrell et al. | 95/143 X |
| 2,702,826 | 2/1955 | Kirshenbaum et al. | |
| 2,886,509 | 5/1959 | Chkristensen et al. | 95/143 X |
| 2,944,627 | 7/1960 | Skarstrom. | |
| 3,069,830 | 12/1962 | Skarstrom et al. | |
| 3,237,377 | 3/1966 | Skarstrom. | |
| 3,237,379 | 3/1966 | Kant et al. | |
| 3,638,399 | 2/1972 | Walker | 95/145 X |
| 3,969,196 | 7/1976 | Zosel | 203/49 |
| 4,061,566 | 12/1977 | Modell | 210/32 |
| 4,124,528 | 11/1978 | Modell | 252/411 |
| 4,147,624 | 4/1979 | Modell | 210/32 |
| 4,239,616 | 12/1980 | Gearhart | 208/309 |
| 4,292,953 | 10/1981 | Dickinson | 126/263 |
| 4,338,199 | 7/1982 | Modell | 210/721 |
| 4,354,859 | 10/1982 | Keller, II et al. | 55/25 |
| 4,434,028 | 2/1984 | Eppig et al. | 196/14.52 |
| 4,478,720 | 10/1984 | Perrut | 210/659 |
| 4,543,190 | 9/1985 | Modell | 210/721 |
| 4,737,164 | 4/1988 | Sarkkinen | 96/144 X |
| 4,786,387 | 11/1988 | Whitlock | 204/186 |
| 4,788,359 | 1/1988 | Schuchardt et al. | 95/115 X |
| 5,013,366 | 5/1991 | Jackson et al. | 134/1 |
| 5,013,443 | 5/1991 | Higashidate et al. | 210/634 |
| 5,087,360 | 2/1992 | Wright et al. | 210/198 |
| 5,094,755 | 3/1992 | Knaebel | 210/677 |
| 5,152,812 | 10/1992 | Kovach | 95/141 X |

FOREIGN PATENT DOCUMENTS

| | | | |
|---|---|---|---|
| 297076 | 1/1992 | Germany | 95/143 |
| 1115784 | 9/1984 | U.S.S.R. | |

OTHER PUBLICATIONS

Jasra et al., "Separation of Gasses by Pressure Swing Adsorption" Separation Science and Technology, 26(7), pp. 885–930, 1991.

Skarstrom, C. W., "Heatless Fractionation of Gases Over solid Adsorbents", Recent Developments in Separation Science, vol. 11, pp. 95–106.

Wankat, P. C., "Cyclic Separation Processes", Separation Science, 9(2), pp. 85–116, 1974.

Chen, H. T., "Thermal parametric Pumping", Parametric Pumping, Section 1.15, pp. 1–468 to 1–486.

Sweed, N. H., "Parametric Pumping", Recent Developments in Separation Science, vol. 1, pp. 59–74, 1972.

Butts et al., "Parametric Pumping Separation of Multicomponents Mixtures: An Equilibrium Theory", Chemical Engineering Science, vol. 27, pp. 855–866, 1972.

McHugh et al., Phase Diagrams for Supercritical Fluid–Solute Mixtures, Supercritical Fluid Extraction, Chpt. 3, pp. 23–67.

King et al., "Supercritical Fluid–Adsorbate–Adsorbent Systems", Supercritical Fluid Extraction and Chromatography, Chpt. 4, pp. 63–88, 1988.

Yonker et al., "Retention Processes in Supercritical Fluid Chromatography", Supercritical Fluid Extraction and Chromatography, Chpt. 9, pp. 162–178, 1988.

H. G. Heitmann "Water and Steam Their Properties and Current Industrial Applications" pp. 535–538, 1980.

*Primary Examiner*—Robert Spitzer
*Attorney, Agent, or Firm*—Wolf, Greenfield & Sacks, P.C.

[57] ABSTRACT

A process is described for the separation of solutes dissolved in a gaseous solvent. The process is useful in the extraction and recovery of solutes using supercritical fluid extraction, and in the purification of impure steam. The process utilizes a sorbent to remove solute followed by an in situ regeneration of the sorbent and the recovery of the solute.

35 Claims, 5 Drawing Sheets

SEPARATION OF SOLUTES IN GASEOUS SOLVENTS

This application is a continuation under 35 U.S.C. §120 of U.S. Ser. No. 08/027,890, filed Mar. 8, 1993 and entitled Separation of Solutes in Gaseous Solvents, now U.S. Pat. No. 5,470,377.

BACKGROUND OF THE INVENTION

This invention relates to a method and apparatus for the separation of solutes dissolved in gaseous solvents. In particular this invention relates to the separation and recovery of one or more solutes dissolved in high pressure gases and the recovery of the purified gas at high pressure. For the purposes of this invention, a gaseous solution is considered to be a solution where the solvent or the solution has significant compressibility.

At low pressure gases are poor solvents, and the potential solubility of a potential solute is limited to its volatility. For example the moisture content of air is limited by the vapor pressure of water at the dew point, which is the temperature at which the vapor pressure of water equals the partial pressure of water in the gas. At high pressure gases can have significant solvent action even for non-volatile substances, for example high pressure steam can dissolve silica at temperatures where the vapor pressure of silica is negligible. See FIG. 4.

The solvent action of a particular gas has a strong dependance on gas density as influenced by pressure or temperature, where a particular gas at high density can dissolve more solute than the same gas at a lower density. This strong effect of density or pressure on solute solubility is well known and is used in the field of supercritical fluid extraction, which is well described by Krukonis and McHugh, in their text "Supercritical Fluid Extraction" Butterworth Publishers 1986, and by Zosel U.S. Pat. No. 3,969,196.

In a typical SCF process a solute is extracted from a substrate using a high density, high pressure gaseous solvent, the solvent is then reduced in pressure (and hence density) to where the concentration of the solute now exceeds the new solubility and the solute precipitates out and can be mechanically recovered from the gaseous solvent which now can be compressed and reused. This typical process is well described by Krukonis and McHugh and earlier by Zosel.

There are drawbacks to this type of density reduction by pressure reduction, and also with the corresponding density reduction by temperature increase process, namely:

1. Significant solute remains dissolved unless the pressure is taken to very low levels, necessitating large compression costs for solvent reuse.
2. Formation of 2 phases in pressure reduction or temperature adjustment equipment can lead to erosion, or reduction of heat transfer coefficients.

There are also cases where a reduction in the pressure of the high pressure gas is not feasible. For example in the production of high pressure steam. Silica is an ubiquitous contaminant in ground and surface water. In a boiler the high pressure steam dissolves some silica and carries it through the system until the turbine where the steam is expanded to low pressure. The silica becomes less soluble in the low pressure steam and precipitates as a solid inside the turbine causing degradation of performance. The solubility of silica and other minerals in steam necessitates extreme purity in boiler feed water and precludes the open cycle use of geothermal steam or steam from supercritical water oxidation as described by Modell U.S. Pat. No. 4,338,199 or Dickinson U.S. Pat. No. 4,292,953. Work is only extracted from the steam by expansion to a lower pressure where silica precipitation is inevitable.

Petroleum can be recovered from underground formations by using high pressure carbon dioxide as a solvent. The expansion, phase separation and recompression of the gas can be expensive and may not recover many of the lighter hydrocarbons, unless expansion to a very low pressure is utilized, which increases compression costs.

SCF processing is used for many separation applications, mostly involving high value materials like specialty food stuffs, such as decaffeinated coffee, where incidentally the solute caffeine is typically not recovered, but is instead irreversibly adsorbed onto activated carbon.

A major cost in SCF processing is the energy needed to compress the fluid so as to restore its solvent properties after expansion to remove solute. A sorbent such as activated carbon can be used to remove solute while avoiding a pressure reduction. Where the desired product is the solute, for example in oil seed extraction or for spice extraction then a pressure change and the resulting energy cost is unavoidable.

Work is a force times a distance. The work of compression of a fluid depends to a great extent on the compressibility of the fluid and the volume change that occurs during compression. Liquids have low compressibilities and require little work to raise their pressure. Gases on the other hand because of their compressibility require much more work to compress. Compression of a dense gas through a modest density change can require less work than compression of the low pressure gas through a larger volume change, even though the pressure change, or the maximum pressure may be lower.

High pressure gases can dissolve solutes in processes where this effect is undesirable. For example in the compression of gases the lubricants from the compressor can contaminate the gas. In the case of carbon dioxide to be used for semiconductor cleaning, separation of lubricants or other low volatility contaminants entails distillation. Distillation of carbon dioxide must occur in the subcritical two phase region. To obtain supercritical carbon dioxide the fluid must then be compressed and heated. In the case where the solute is a solid, distillation results in the formation of solid in the distillation column which can cause plugging and inefficient operation. Similarly fluids used in cryogenic refrigeration cycles must be cleaned of solutes prior to expansion so as to avoid solid formation and concentration of oil in the evaporator and inadequate lubrication of the compressor.

Supercritical fluid chromatography in particular when using pressure programming can be used to separate a great many compounds, especially hydrocarbons on an analytical scale. Extremely pure fluids are needed, and compressor lubricants cannot be easily removed.

OBJECTS OF THE INVENTION

1. To provide a process where a solute can be separated and recovered from a gaseous solvent.
2. To provide a process where a gaseous solvent can be purified to an arbitrarily high level.
3. To provide a process where a solute can be separated from a gaseous solvent to arbitrarily high levels.
4. To provide a process where different solutes with different solubility properties can be separated from each other while dissolved in a gaseous solvent.

5. To remove silica and other minerals from impure steam to allow its use in processes requiring pure steam such as turbines.

6. To purify a SCF solvent for reuse.

7. To provide a separation process which can avoid passing a two phase mixture through a pressure changing device or a temperature changing device.

THEORY OF OPERATION

Prior methods for removing solutes from gaseous solvents have either involved the change of pressure or temperature to form a two phase mixture, or the use of a sorbent to irreversibly sequester the solute.

There is a body of art concerned with a similar problem, that of separating gases from each other. For example when ambient air is compressed the moisture present in the ambient air contaminates the compressed air and for many uses this moisture must be removed. Droplets of water can be mechanically filtered, but water vapor presents a different problem. Refrigerated air driers cool the air and so lower the dew point of the dried air. Beds of sorbent or desiccant can be used, and these beds can be regenerated by heating.

Another method is known as pressure swing adsorption, or when applied to air drying, oxygen recovery from air, and separation of hydrocarbons "heatless drying", or "heatless fractionation" (S. Skarstrom et al. in U.S. Pat. Nos. 3,069,830, 3,237,377 and 2,944,627 and Kant et al. in U.S. Pat. No. 3,237,379). In the drying process water vapor in high pressure (150 psia) air is adsorbed onto a sorbent in a bed, and then the bed is depressurized and a volume of dry air at low pressure is passed through the bed in the opposite direction where this regenerating air now removes the adsorbed moisture from the desiccant. This process works because the vapor pressure of water sorbed onto the desiccant is (nearly) independent of the pressure of the air also in contact with the desiccant. Ten volumes of air at 150 psia hold as much water vapor as ten volumes of air at 15 psia. In operation ten volumes of air at 150 psia can be dried to a very high level in a bed of desiccant and then the pressure is reduced and perhaps twenty volumes of air at 15 psia is back flowed through the bed and used for bed regeneration. This still leaves eight volumes of dried air at 150 psia for use.

Heatless drying and other forms of pressure swing adsorption are concerned with the separation of one type of gas from another where the gases behave as an ideal mixture and the presence or absence of one gas does not greatly affect the sorption of the other gases. In the separation of water from air, the air does not greatly affect the partial pressure of water, and air at reduced pressure is used for regeneration. The current state of the art in pressure swing adsorption is well described in an article by R. V. Jasra et al "Separation of Gases by Pressure Swing Adsorption", Separation Science and Technology, 26(7), pp. 885–930, 1991. In all processes the sorbent is loaded at high pressure and desorbed at low pressure.

In the context of this disclosure a gaseous solvent is considered to be a solvent with a significant compressibility, and a solute or a non-gaseous solute is a species whose thermodynamic chemical potential decreases with increased density of the gaseous solvent or solution.

In the process of this invention a gaseous solvent is to be purified. In a gaseous solvent, the solubility of a solute increases with increased density of the solvent. The thermodynamic chemical potential of a pure solid or liquid is a very weak function of pressure, and so in a saturated solution where the gaseous solution is in equilibrium with pure solute the chemical potential of the solute in solution is also independent of pressure if the solution remains saturated. The chemical potential of a species in solution not at saturation is to a first approximation proportional to the fractional degree of saturation. When there is a difference in chemical potential of a species between two phases the species moves from regions of higher chemical potential to regions of lower chemical potential until the chemical potential is uniform. Thus in an under saturated solution in contact with pure solute the solute dissolves until the solution is saturated. Similarly in a supersaturated solution solute precipitates.

When a mixture of gaseous species is isothermally compressed, the chemical potential of each of the gaseous species increases. In the case of water vapor in air, the chemical potential increases until it exceeds that of liquid water and liquid water then precipitates. The vapor pressure of water (and the chemical potential) remains constant as total pressure increases and more water precipitates.

When a gaseous solution is isothermally compressed the chemical potential of the solvent gas increases, but the chemical potential of the non-gaseous solute decreases. The solubility of a non-gaseous solute increases with increased pressure and more solute must then dissolve to maintain the chemical potential of the solution. This phenomena is universally observed in the near super critical region and is commonly exploited during SCF processing. In FIG. 4 the change in solubility of silica in water can be seen to increase with pressure along the various isotherms. This behavior is also observed in the subcritical gaseous region, although it is less pronounced.

If a mixture of air and water vapor is maintained in equilibrium with a desiccant, then the chemical potential of water on the desiccant and in the gas are equal. If the gas is isothermally compressed water will move onto the desiccant. If the gas is isothermally expanded water will move off the desiccant.

If a solution of a gaseous solvent and a solute is maintained in equilibrium with a sorbent then the chemical potential of the solute on the sorbent and in the solution are equal. If the gaseous solution is isothermally compressed then the chemical potential of the solute in solution decreases and solute moves off the sorbent and into solution. If the solution is expanded, then solute moves out of solution and onto the sorbent. This behavior is opposite that observed with gaseous mixtures, and opposite that observed and utilized in pressure swing adsorption or heatless drying. Just as pressure swing adsorption is a form of parametric pumping, so is the process of this invention. Solute is sorbed at low pressure and is desorbed at high pressure.

DESCRIPTION OF THE INVENTION

A process complementary to pressure swing adsorption is described where a gaseous solution is purified by adsorption onto a sorbent bed, and then by increasing the pressure and hence the density and reversing the flow the sorbent bed can be regenerated.

Figure 1:
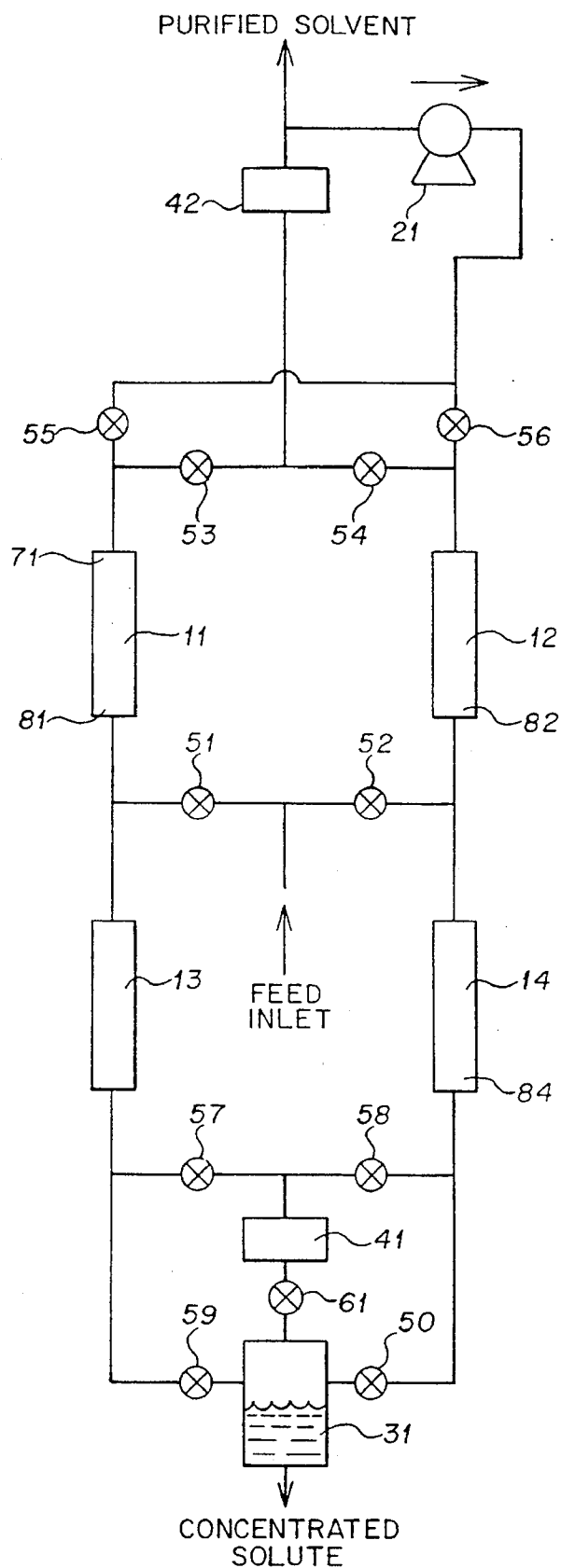
FIG. 1 is a cross-sectional view of an apparatus according to an illustrative embodiment of the present invention.

Consider the apparatus of FIG. 1 processing a feed containing carbon dioxide as the solvent and naphthalene as the solute at a temperature of 35° C. At 1100 psi the solubility is 0.2%, while at 1300 psi the solubility is 2.0%, all on a weight basis.

If a feed containing 0.1% naphthalene at 1100 psi (50% of saturation) is caused to flow in the bottom (81) of and through adsorption column 11 which is packed with a suitable sorbent for example activated carbon, the naphthalene will adsorb on the sorbent and pure carbon dioxide will leave at the top (71). If 1000 kg of mixture is passed through, then 999 kg of $CO_2$ will be recovered and 1 kg of naphthalene will remain in the bed. At the base 81 of the bed where the feed first contacts the sorbent, the sorbent becomes loaded until the chemical potential for naphthalene is 50% of saturation.

The feed flow is now diverted by closing valve 51 and opening valve 52 to adsorption column 12, and pump 21 is activated to pressurize adsorption columns 11 and 13 through valve 55 from 1100 to 1300 psi. The solubility of naphthalene now increases to 2.0%, but the chemical potential of the naphthalene on the sorbent at the base 81 of adsorption column 11 does not change with pressure, and so is still 50% of saturation. The saturation value is now 2.0%, so naphthalene desorbs from the sorbent until the fluid concentration at 81 is half the saturation value, or 1.0%. Pump 21 continues to pump, and fluid with 1.0% naphthalene continues to move into column 13 until the 1 kg of naphthalene has been moved. This takes ideally 100 kg of $CO_2$. This fluid passes through column 13 and through the throttle valve 61 where the pressure is reduced to 1100 psi. The solubility at 1100 psi is only 0.2%, so the excess naphthalene precipitates and saturated naphthalene in $CO_2$ passes up through column 14. The excess naphthalene, or 0.8 kg collects in vessel 31. Column 14 is loaded with sorbent, which adsorbs the naphthalene, and at the base 84 becomes loaded until the chemical potential equals that at saturation. The partially depleted $CO_2$ passes up through column 14 and joins with fresh feed prior to entering column 12 where naphthalene is removed completely as in column 11.

When column 12 and 14 are pressurized with pump 21 to 1300 psi, the sorbent at the base 84 of 14 is loaded to the chemical potential of a saturated solution and so the naphthalene content of fluid leaving 14 at 84 will be 2.0%. That at the base 82 of 12 will be 1.0%. It is necessary to remove 1.1 kg of naphthalene from column 12, which should take ideally 110 kg of $CO_2$. 0.11 kg will be trapped in column 13 with 0.11 being trapped in 11 and the remainder being collected as solid in vessel 31.

This series of operation can be repeated many times by operating valves 50 to 59 in the proper sequence, or by providing automatic controls to do so. Provided that the flow volumes are matched to the proper pressure and sufficient quantities of high pressure $CO_2$ are used for regeneration arbitrary quantities of naphthalene-free $CO_2$ can be recovered. Because the solubility and hence chemical potential increases 10 fold over the pressure change from 1100 to 1300 psi, the regeneration of the columns with high pressure fluid requires (ideally) one tenth as much $CO_2$ as in the total feed stream, and the solute can in this case be recovered as a pure material. Operationally it is easier to use an excess of fluid for regeneration so as to maintain a margin of safety in terms of product purity, and to account for non-idealities and irreversibilities in the process. The flows used in this example are illustrative, and represent the ideal case.

Figure 2:
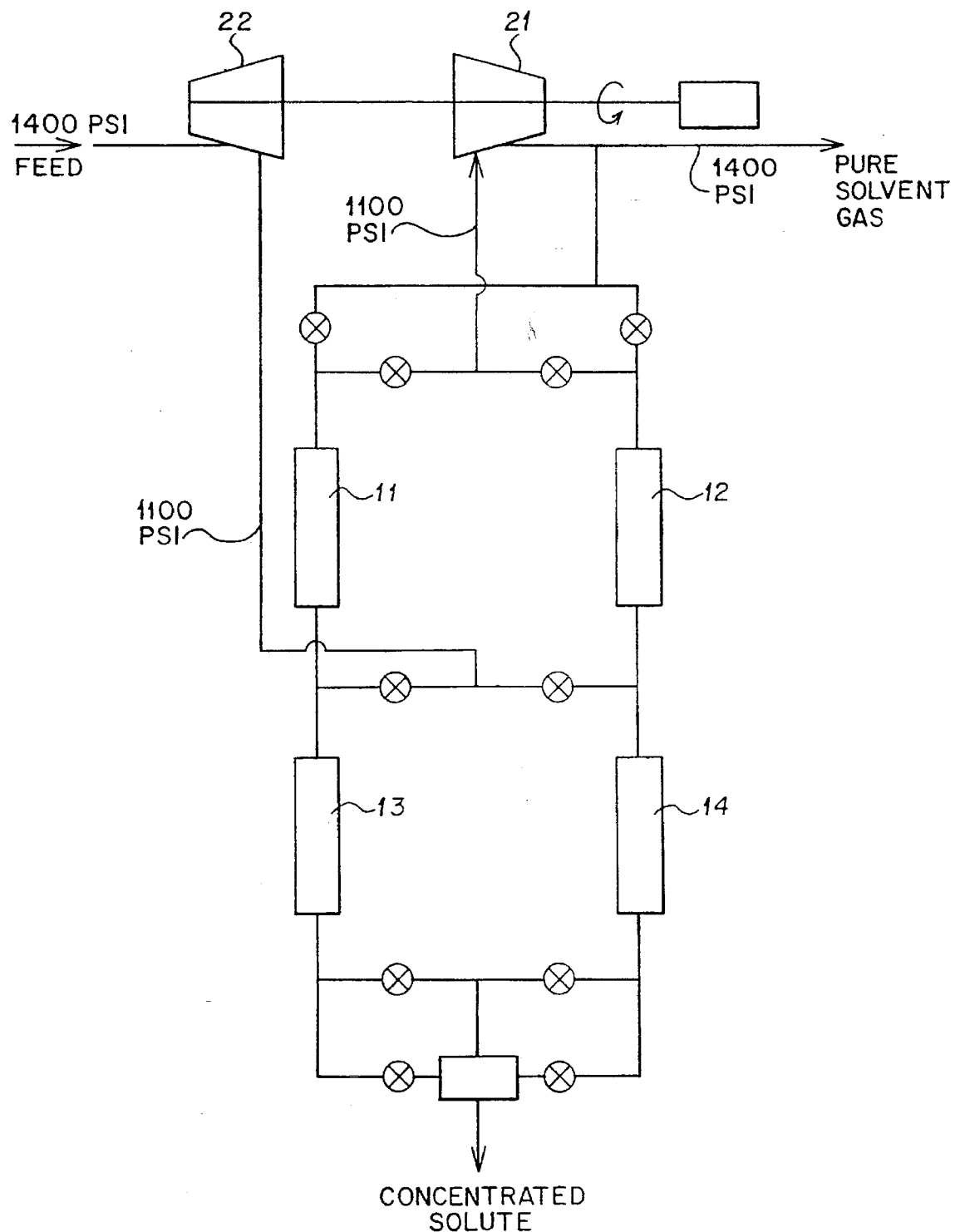
FIG. 2 is a cross-sectional view of a portion of an apparatus according to another illustrative embodiment of the present invention.

In many cases a mixture of solutes is dissolved in a gaseous solvent and the simultaneous recovery of all solutes is desired, for example in the recovery of petroleum with CO2 flooding. Carbon dioxide is an inexpensive fluid that at high pressure is a good solvent for most hydrocarbons, and which lowers the viscosity of oil. Typically $CO_2$ is fed under pressure into a petroleum formation where the residual hydrocarbons are dissolved and expanded by the $CO_2$. The resulting mixture is removed from the formation. The $CO_2$ has a much lower viscosity than the $CO_2$ —oil mixture and so viscous fingering and the resulting non-plug flow through the formation can lead to dilution of product with $CO_2$. Many of the petroleum fractions that have value are miscible with high pressure $CO_2$, and recovery of petroleum and $CO_2$ for reinjection can be difficult. Consider the apparatus in FIG. 2. In this case a fluid stream such as from a $CO_2$ enhanced oil recovery process or a natural gas stream rich in natural gas liquids is fed into an expander 22 to recover work. The expanded stream is then fed into columns, such as in FIG. 1 where solutes are adsorbed onto a sorbent and separated from the solvent gas. The expanded and cleaned fluid is then compressed in 21 using the work recovered in the prior expansion. A portion of the compressed fluid is then used to regenerate the sorbent beds. The expander can in principle be operated in a singlephase region where equipment is more reliable and efficient, yet solutes can be recovered completely. Additional work is needed to recompress the regenerant fluid. This embodiment can be useful in petroleum recovery and refining, such as to increase the efficiency of for example propane deasphalting or Residuum Oil Supercritical Extraction (the ROSE process), and in natural gas processing, or where it is necessary to remove a solute from a gaseous solvent. Krukonis and McHugh in their book describe many examples of gaseous solvent processes where the present invention would be useful. Useful solvents can be chosen from a list which includes: CH4, C2H4, C2H2, C2H6, C3H8, C3H6, C4H10, C4H8, CO2, H2O, NH3, N2O, Ar, Kr, Xe, H2S, SO2, O2, N2, SiH4, SiF4, BH3, BF3, SF6, CF4, aromatic hydrocarbons, aliphatic hydrocarbons, halocarbons, hydrohalocarbons, natural gas, natural gas liquids, naphtha, esters, ethers and organometallic compounds.

The process can be used to separate and recover toxic contaminants from various substrates. For example SCF $CO_2$ can be used to extract waste oils, PCB's, aromatic hydrocarbons, and other soluble compounds from contaminated soil. The process of this invention allows these contaminants to be concentrated using the apparatus of FIG. 1 up to levels where the contaminant can be incinerated or recycled, and the solvent can be purified to very high levels so that reuse of the solvent for continued extraction can result in nearly complete removal of contaminants from the soil. A gaseous solvent can be used to extract solutes from substrates chosen from a list which includes coffee beans, tea leaves, tobacco, contaminated soil, paper making sludge, oil shale, oil sands, coal, mill scale, dredge spoils, still bottoms, residual oil, asphalt, waste oil, oil seeds, oil bearing nuts, fried food, spices, cocoa beans, animal fat bearing material, coffee, tea, fish, oil bearing material, polymeric materials, fermentation broth, contaminated equipment, activated carbon and waste water, and a resulting gaeous solution can then be separated using the process of this invention. The separation of the solute from the gaseous solvent occurs in the sorption column, and it is in principle not necessary to ever form a 2 phase mixture, as is necessary in conventional SCF processing, as in the process of Eppig et al (4,434,028), where the solvent and solute form a two phase mixture for separation. A gaseous solvent can be used to extract solutes from substrates chosen from a list which includes coffee beans, tea leaves, tobacco, contaminated soil, paper making sludge, oil shale, oil sands, coal, mill scale dredge spoils still bottoms, tesidual oil, asphalt, waste oil, oil seds, oil bearing nuts, fried food spice, cocoa beans, animal fat berring material, coffee, tea, fish oil bearing material, polymeric materials, fermentation groth, contaminated equipment, activated carbon and waste water, and a resulting gaeous solution can then be separated using the process of this invention;

Regeneration of sorbents using supercritical fluids has been disclosed by Modell (4,061,566 4,124,528, 4,147,624), and has been well studied and described by Krukonis and McHugh in their book. These discuss the removal of adsorbates from sorbents where the sorbents were first used to adsorb solutes from an aqueous solution, and the gaseous solvent used to desorb the solute and then is treated to make the gaseous solvent a non-solvent for the solute under consideration. While activated carbon can be regenerated with supercritical fluids, the adsorption of a solute can be substantial even in a dilute SCF solution. Krukonis presents data showing a loading of 0.2 g of alachlor (a synthetic pesticide) per gram of carbon at an alachlor concentration two orders of magnitude below saturation. He thus shows that the regeneration expected by Modell is limited due to equilibrium effects.

The process of the current invention can be used to remove solutes from a gaseous solvent while at all times maintaining the fluid at conditions where it remains a solvent for the desired solute. The equilibrium effects that limit the effectiveness of the process described by Modell are used in the process of the present invention to produce the desired separation.

The process can also be used for separating a mixture of solutes. In FIG. 1 the detector 42 monitors the stream from 11 and 12, and to produce pure gaseous solvent the columns are regenerated when any solute is detected. If it is desired to separate more strongly adsorbed species from less strongly adsorbed species, then the regeneration is delayed until the detector 42 detects the presence of the more strongly adsorbed species (which only starts to come out of the sorption column after substantial quantities of the more weakly adsorbed species has), then significant amounts of the weakly held species can be recovered free of the more strongly held species in the fluid collected at the top of the apparatus. Similarly a detector 41 on the bottom can be used to detect the presence of the weakly held species during regeneration, and to divert flow from the receiving vessel 31 into the adsorption columns 13 or 14 for additional separation.

In many systems of two or more solutes, the solubility and hence the concentration of one of the solutes can affect the solubility or chemical potential of the other solute. The use of so called "entrainers" can be used to increase solubility and increase extraction rate in SCF processing. When a solution with a mixture of solutes is passed through an adsorption column the sorbent likely has a different affinity for each solute. The solute with the highest affinity preferentially adsorbs first and solutes with lesser affinities are adsorbed later in the bed. In a long column this behavior results in sequential breakthrough of the solutes. This same behavior is utilized in chromatography where a mixture is injected at one end and the separated compounds elute out sequentially at the other. There is a great deal of art concerning the manufacture and selection of sorbents with differential sorption affinities for different compounds so that the compounds may be separated and resolved in chromatography. In chromatography, the fluid can be assumed to be in equilibrium with the packing, and the sequential elution that is observed results from the solute—sorbent equilibrium and the different times that different solutes spend in the mobile phase, or on the stationary phase.

Similarly the process of this invention can be used to separate different solutes with different affinities for the sorbent used, and methodologies for sorbent selection similar to those used in chromatographic art can be used.

Figure 3:
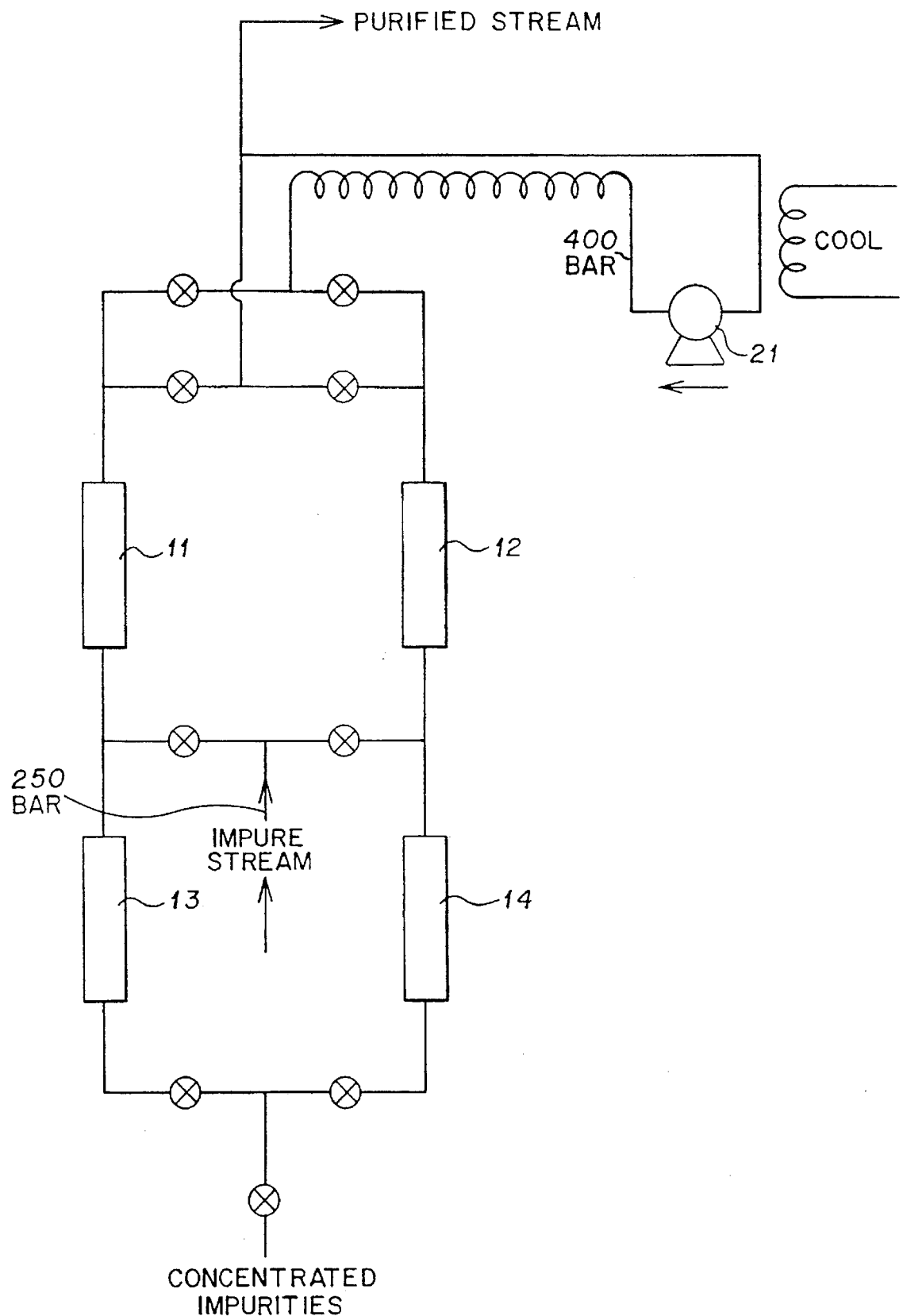
FIG. 3 is a cross-sectional view of a portion of an apparatus according to the present invention.

In FIG. 3 an embodiment is shown that can be useful for removing silica, scale forming minerals and other impurities from impure steam, for example geothermal steam, or supercritical water oxidation products, or steam derived from wet air oxidation.

Figure 4:
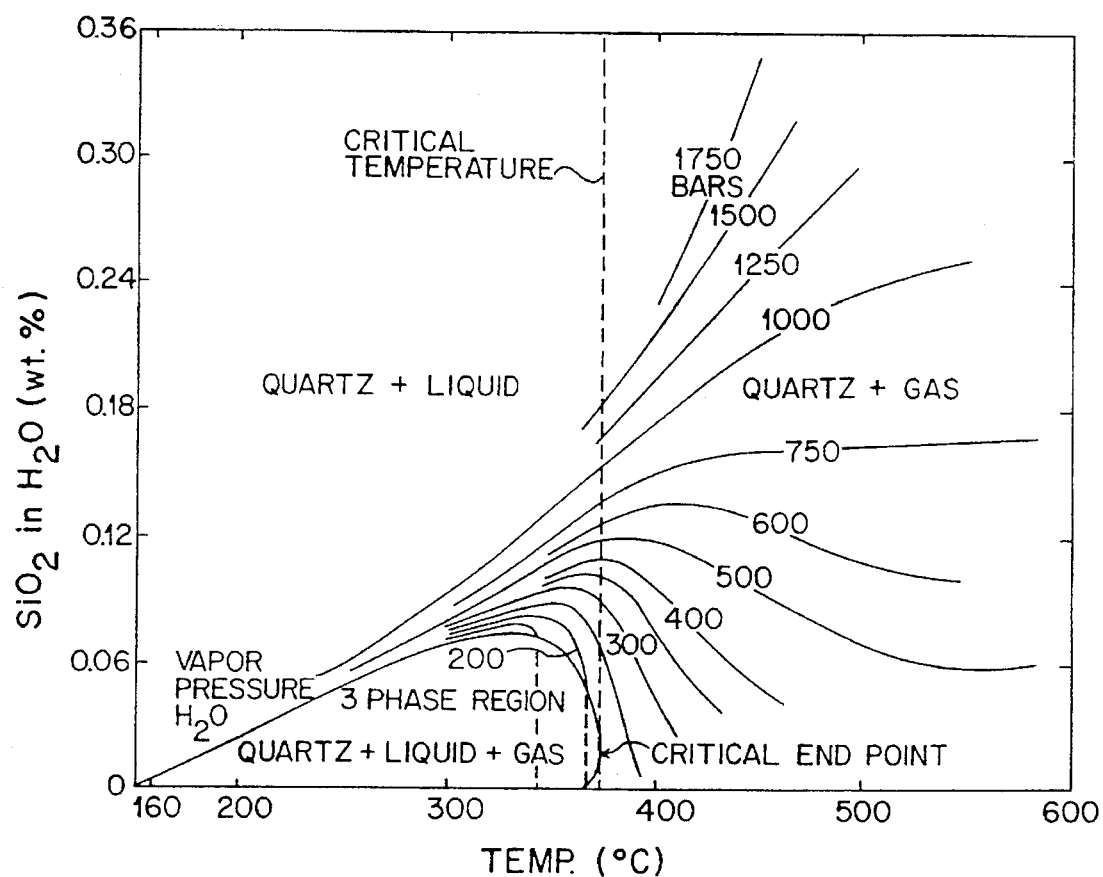
FIG. 4 is a phase diagram of a silica-water system.

FIG. 4 shows the solubility of silica in water.

It can be seen that silica is appreciably soluble in high pressure steam. In operation the steam is cleaned by passage through the sorption column. A portion of the fluid is withdrawn and passed through a heat exchanger to cool the fluid so as to protect the pump from extremes of temperature.

An examination of the solubility curve of silica in water shows that in the near supercritical region, the solubility decreases with increasing temperature. In the apparatus of FIG. 3 some heat is removed prior to the pump 21, so the regenerating fluid is at a higher pressure and at a lower temperature. The FIG. 3 apparatus requires no external source of pure water and will produce ultra pure steam from any source of low purity steam.

Instead of cooling, compressing and reheating a portion of the cleaned steam, pure water could be heated and directly injected instead. Alternatively water at a lower temperature could be injected.

Figure 5:
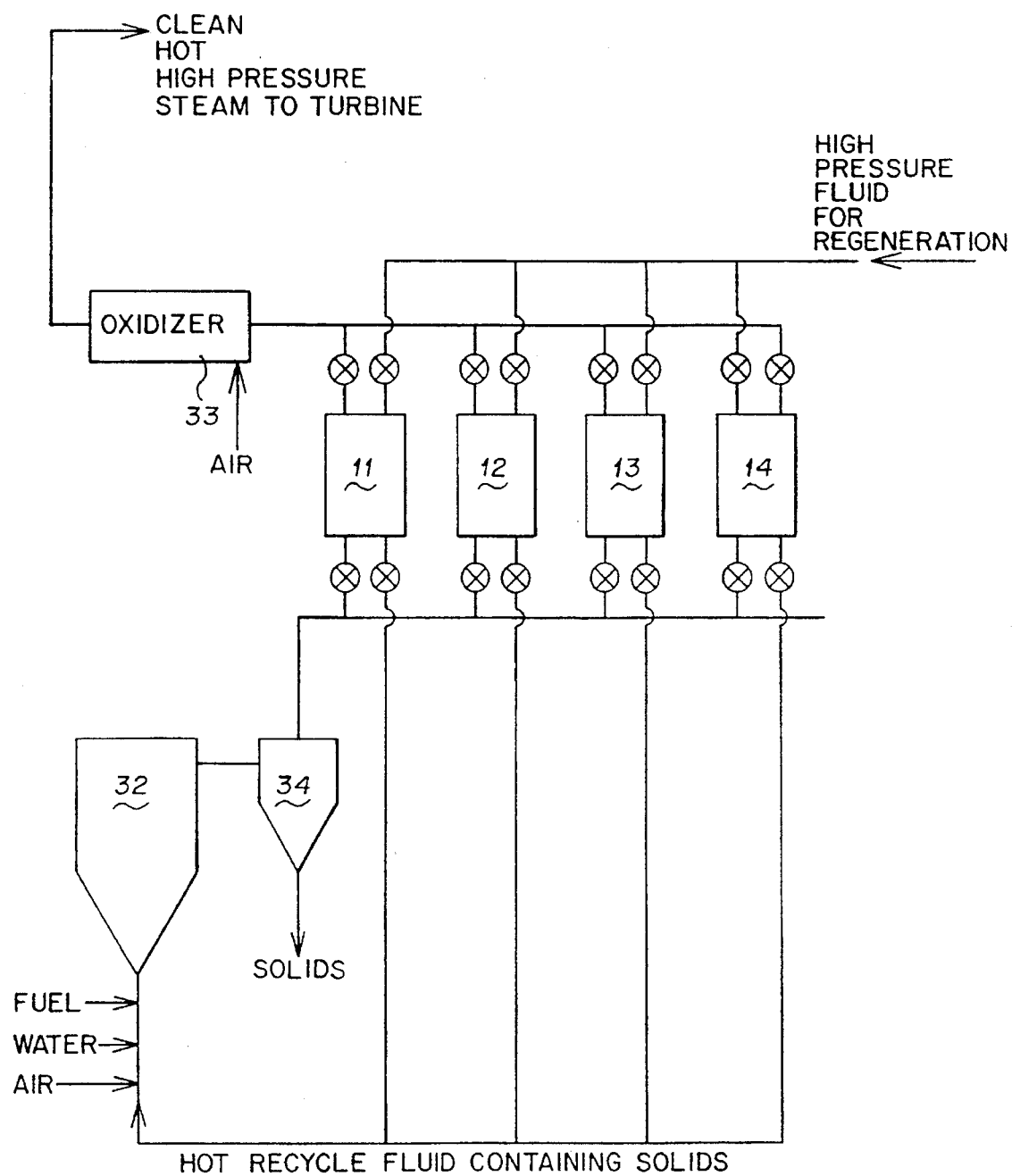
FIG. 5 is a portion of an apparatus according to yet another illustrative embodiment of the present invention.

For example in FIG. 5 water from a SCW oxidizer 32 at 300 bar and 440° C. has a silica solubility of 0.01%. At 400 bar and 370° C. the solubility is 0.1%. Thus 1/10 of the product steam would require compression for regeneration. The use of a lower temperature for regeneration reduces the amount of fluid needed, but the bed needs to be heated back to operating temperature to prevent transport of silica through the bed.

The cleaning of steam and the regeneration of the sorbent beds is most easily achieved in the near supercritical region. Mechanical work is most efficiently extracted from steam that is much hotter. A SCW oxidation reactor 32 can be operated with less than stoichiometric oxygen so that the temperature is in the near supercritical region and combustible organic remains. In SCW most organic materials are miscible, and have critical points lower than water. These organic species would not be concentrated with the minerals, but would stay in the water rich phase. Dissolved minerals can be removed and the steam still containing substantial fuel value can be combined with additional high pressure air in reactor 33, and clean, high temperature, high pressure steam can be made without heat transfer surfaces in contact with impure streams. The higher pressure steam with a high mineral content can be used to preheat incoming water, air, or fuel by direct contact, and the minerals can then be taken out with the other solids in the initial reactor, or in a post reactor solids separator 34.

In some cases modest chemical treatment can improve the treatability of the contaminated steam. For example H2S is commonly present in geothermal steam. This can be oxidized to H2SO4 which is less volatile, and easier to remove with the present invention. After expansion of the clean steam the steam can be condensed to recover pure water.

Sorbent selection is important, but not critical. The sorbent must sorb the solute, and must be resistant to the fluids and temperatures used. Sorbents such as zeolites, activated carbon, molecular sieves, (organic and inorganic), silica gel, activated alumina, and polymeric adsorption resins are well known sorbents and can be used in the present invention. Prior art useful in the selection of suitable sorbents is the chromatographic art where solids as well as liquids on solid supports are commonly used as sorbents. Liquids can be used as sorbents, but substantial complexity involving multiple pumps is encountered unless the liquid is held on a solid support. Also rapid mass transfer requires high interfacial area and short diffusion paths, especially in any liquid phase, which is difficult to achieve without a solid support. In the case of steam purification, the fluid can be brine in some regions of the phase diagram, and a solid substrate in other regions. When the process of this invention is practiced in the two phase region, then one of the condensed phases can be utilized as the sorbent.

The chemical potential of the solute in the gaseous phase and the sorbent phase is determined by thermodynamic equilibrium effects. The process of this invention works best when mass transfer is good between the gas and the condensed phases, either the solid sorbent, or the fluid sorbent layer. This is conveniently achieved by using small sorbent particles to minimize the diffusion path. Other well known means to augment the mass transfer can be desirable. For example providing a pulsatile flow so as to provide mixing while still maintaining plug flow is a well known technique for enhancing mass transfer in fluid-fluid contacting. Another method is to use an electric field. Electric field gradients are well known for their ability to move regions of different dielectric constant, and in a packed bed of a dielectric, the application of an external electric field will facilitate the capture of droplets by the solid. Liquid on a solid substrate is held there by capillary action where the surface tension of the liquid stabilizes the position of the droplet on the solid particle, especially when there is surface roughness. Some aspects of the use of electric fields for the capture and filtering of droplets with electric fields are discussed in U.S. Pat. No. 4,786,387 and in the references discussed therein. In that process, an electric field was used to shift the equilibrium as well as augment the mass transfer. In the present process the equilibrium is shifted by the pressure change, and any electric field is only used to augment the mass transfer, and by the process of dielectric filtration reduce the entrainment of droplets of fluid containing impurities toward the purified gas end. This can be particularly useful when high gas velocities are desired and entrainment of liquid is a potential problem.

Desirable properties for a sorbent are:
1. reversible sorption
2. stability over many sorption-desorption cycles
3. selectivity (for solute-solute separation)
4. low cost
5. rapid mass transfer properties High sorption capacity is not especially important. The fraction of fluid that must be compressed and used for regeneration is a function of chemical potential and thermodynamic equilibrium effects of the solvent-solute system, and not a function of the sorbent capacity. The sorbent capacity will affect the time between regeneration cycles, but not the ratio of product to regenerant. A high sorbent capacity will allow longer cycles and smaller sorption beds. The cycle length may be important for other considerations, for example the fatigue life of cycling pressure vessels. The volume of fluid to be compressed, the flow rate, the capital and operating cost of the compressor are nearly independent of cycle length (neglecting sorbent bed void volume). A large system would likely use a multiplicity of columns so the compressor would be operating continuously, and the cycling achieved by valves.

Relative sorbent capacities for different solutes, or selectivity is important for solute-solute separation, where the relative sorption capacity of a bed for a particular solute determines the breakthrough order. Parametric pumping is a well known technique that has been well studied theoretically, and which theory allows for the rational selection of sorbents and the estimation of separation per cycle.

In some cases the sorbent can be generated in situ. This is especially useful where the sorbent deteriorates with time, or has some irreversible sorption characteristics, or where the active component of the sorbent system is generated in situ. For example in the clean up of SCW oxidation products a high area ZrO2 can be used. This can be generated in situ by injection of zirconium compounds that decompose or react to form ZrO2 particles. These particles can trap a thin layer of brine or scale formed from salts dissolved in the steam. This brine and scale layer has a high affinity for minerals and can act just like a solid sorbent. This is analogous to the use of supported liquids in gas-liquid chromatography. Compounds can be added to facilitate brine formation of the proper chemistry. Similarly aerogels are often made by reacting gel forming Compounds in a fluid and then removing the fluid above its critical point. For metal oxide aerogels the typical solvent is water. A soluble precursor is reacted in solution to form the insoluble oxide. Water and reaction products are then removed to leave behind the oxide aerogel, which with its high surface area can be an effective sorbent. Similar processes are used to make zeolites which are well known sorbents. Useful sorbents can be chosen from a list which includes activated carbon, activated alumina, zeolite, chromatographic support, metal oxides, silica gel, molecular sieves, liquid on a solid support, aerogels, scale forming minerals, brines, brines on solid supports, metal salts and polymeric adsorption resins.

What is claimed is:

1. A process for separating at least one solute dissolved in a gaseous solvent from the gaseous solvent under conditions where a chemical potential of the at least one solute dissolved in the gaseous solvent decreases as a density of the gaseous solvent increases, the process comprising the steps of:

passing the gaseous solvent containing the at least one solute, the gaseous solvent being at a first density, through a bed of sorbent in a first direction so as to sorb the at least one solute from the gaseous solvent onto the bed of sorbent while producing a purified gaseous solvent reduced in concentration of the at least one solute;

acting upon a portion of the purified gaseous solvent so as to achieve a second density so that the portion of the purified gaseous solvent has an increased solvent capacity for the solute;

passing the portion of the purified gaseous solvent at the second density through the bed of sorbent in a second direction opposite the first direction so as to desorb the at least one solute from the bed of sorbent producing a gaseous solution of the at least one solute dissolved in the portion of purified gaseous solvent; and recovering the gaseous solution of the at least one solute dissolved in the portion of purified gaseous solvent to form a recovered portion of the gaseous solution at a third density.

2. The process according to claim 1, further comprising the additional steps of:

acting upon the recovered portion of the gaseous solution so as to decrease the third density of the recovered portion of the gaseous solution to the first density of the gaseous solvent;

allowing the recovered portion of the gaseous solution to approach phase equilibrium and form a more concentrated solute phase and a more dilute solvent phase;

separating the more concentrated solute phase from the more dilute solvent phase; and recovering the more concentrated solute phase and passing the more dilute solvent phase at the first density through a bed of sorbent.

3. The process according to claim 2, wherein an electric field is used to facilitate a separation of the more dilute solvent phase and the more concentrated solute phase.

4. The process according to claim 1, wherein the portion of the purified gaseous solvent is taken from the purified gaseous solvent at the first density.

5. The process according to claim 1, wherein the portion of the purified gaseous solvent is supplied from outside the process.

6. The process according to claim 1, wherein the step of acting upon a portion of the purified gaseous solvent includes increasing a pressure of the purified gaseous solvent to change the first density of the purified gaseous solvent to the second density of the gaseous solvent.

7. The process according to claim 1, wherein the step of acting upon a portion of the purified gaseous solvent includes increasing a temperature of the purified gaseous solvent to change the first density of the purified gaseous solvent to the second density of the gaseous solvent.

8. The process according to claim 1, wherein the gaseous solvent is selected from the group consisting of $CH_4$, $C_2H_4$, $C_2H_2$, $C_2H_6$, $C_3H_8$, $C_3H_6$, $C_4H_{10}$, $C_4H_8$, $CO_2$, $H_2O$, $NH_3$, $N_2O$, Ar, Kr, Xe, $H_2S$, $SO_2$, $O_2$, $N_2$, $SiH_4$, $SiF_4$, $BH_3$, $BF_3$, $SF_6$, $CF_4$, aromatic hydrocarbons, aliphatic hydrocarbons, halocarbons, hydrohalocarbons, natural gas, natural gas liquids, naphtha, esters, ethers, organometallic compounds and mixtures thereof.

9. The process according to claim 1, wherein the bed of sorbent includes a sorbent selected from the group consisting of activated carbon, activated alumina, zeolite, chromatographic support, metal oxides, silica gel, molecular sieves, liquid on a solid support, aerogels, scale forming minerals, brines, brines on solid supports, metal salts, polymeric adsorption resins and mixtures thereof.

10. The process according to claim 1, wherein the at least one solute is selected from the group consisting of silica, vegetable oils, seed oils, fish oils, animal oils, mineral oils, NaCl, aromatic hydrocarbons, lubricating oils, silicone oils, PCB's, $CaCO_3$, natural petroleum oil, halogenated hydrocarbons, waste oils, scale forming minerals, metal halides, caffeine, carboxylic acids, lipids and mixtures thereof.

11. The process according to claim 1, wherein the at least one solute is extracted from a substrate selected from the group consisting of coffee beans, tea leaves, tobacco, contaminated soil, papermaking sludge, oil shale, oil sands, coal, mill scale, dredge spoils, still bottoms, residual oil, asphalt, waste oil, oil seeds, oil bearing nuts, fried food, spices, cocoa beans, animal fat bearing material, coffee, tea, fish oil bearing material, polymeric materials, fermentation broth, contaminated equipment, activated carbon, waste water, and mixtures thereof.

12. The process according to claim 1, wherein mass transfer between the gaseous solvent and the bed of sorbent is enhanced by one selected from the group consisting of pulsatile flow and an electric field.

13. A process of separating from each other at least two solutes dissolved in a gaseous solvent under conditions where a chemical potential of a first solute of the at least two solutes dissolved in the gaseous solvent decreases as a density of the gaseous solvent increases, the process comprising the steps of:

passing a first gaseous solution of the at least two solutes dissolved in the gaseous solvent at a first density in a first direction through a bed of sorbent so as to sorb the first solute of the at least two solutes without sorption of a second solute of the at least two solutes to form a purified gaseous solvent;

collecting the purified gaseous solvent;

acting on a volume of the purified gaseous solvent to bring it to a second density, so that the purified gaseous solvent has increased solvent affinity for the first solute;

passing the volume of the purified gaseous solvent at the second density through the bed of sorbent in a second direction opposite the first direction to desorb the first solute from the bed of sorbent and to dissolve the first solute in the volume of the purified gaseous solvent to form a second gaseous solution;

collecting the second gaseous solution to recover the first solute.

14. The process according to claim 13, further comprising a step of acting upon the second gaseous solution so as to recover a portion of the first solute or acting upon the purified gaseous solvent so as to recover a portion of the second solute.

15. A process of purification of impure steam under conditions where a chemical potential of at least one impurity in the impure steam decreases as a density of pure steam increases, the process comprising the steps of:

passing the impure steam at a first density through a bed of sorbent in a first direction so as to adsorb the at least one impurity in the impure steam and so as to recover a portion of pure steam;

acting on a portion of pure water, so as to produce pure water at a second density;

passing the pure water at the second density through the bed of sorbent in a second direction opposite the first direction so as to desorb the at least one impurity from the bed of sorbent and to dissolve the at least one impurity in the pure water;

recovering the water containing the at least one impurity desorbed from the sorbent.

16. The process according to claim 15, wherein the impure steam is derived from oxidation of fuel in direct contact with water in a subcritical region or a supercritical region.

17. The process according to claim 16, wherein the water containing the at least one impurity is used to heat feed water, fuel, or oxidizer.

18. The process according to claim 16, wherein the impure steam in a purified state is combined with an oxidizer to produce purified steam at a higher temperature.

19. The process according to claim 15, wherein the impure steam is derived from geothermal sources.

20. The process according to claim 15, wherein the portion of pure steam is expanded to recover work.

21. The process according to claim 15, wherein the portion of pure steam is condensed to recover pure water.

22. A process for separating at least one solute dissolved in a gaseous solvent from the gaseous solvent under conditions where a chemical potential of the at least one solute dissolved in the gaseous solvent decreases as a density of the gaseous solvent increases, the process comprising the steps of:

passing the gaseous solvent containing the at least one solute through a bed of sorbent in a first direction so as to sorb the solute onto the bed of sorbent, producing a purified gaseous solvent;

acting upon the purified gaseous solvent to increase a solvent capacity of the purified gaseous solvent for the at least one solute to produce an increased capacity gaseous solvent;

passing the increased capacity gaseous solvent through the bed of sorbent in a second direction opposite the first direction so as to dissolve the at least one solute in the increased capacity gaseous solvent to produce a gaseous solution including the solute; and recovering the at least one solute from the gaseous solution.

23. The process of claim 22 further comprising a step of monitoring the purified gaseous solvent.

24. The process of claim 22, further comprising a step of monitoring the gaseous solution.

25. A process of separating a first solute of at least two solutes dissolved in a gaseous solvent under conditions where a chemical potential of the first solute dissolved in the gaseous solvent decreases as a density of the gaseous solvent increases, the process comprising the steps of:

passing the gaseous solvent containing the at least two solutes through a bed of sorbent in a first direction to sorb the first solute to the bed of sorbent to produce a first purified gaseous solvent;

collecting a second solute of the at least two solutes from the first purified gaseous solvent;

acting on the first purified gaseous solvent to increase its affinity for the first solute to produce an increased affinity gaseous solvent;

passing the increased affinity gaseous solvent through the bed of sorbent in a second direction opposite the first direction to desorb the first solute from the bed of sorbent and to dissolve the first solute in the increased affinity gaseous solvent, producing a second gaseous solvent; and recovering the first solute from the second gaseous solvent.

26. The process of claim 25, further comprising a step of monitoring the first purified gaseous solvent.

27. A process of purifying impure steam containing impurities, comprising the steps of:

passing the impure steam containing impurities through a bed of sorbent in a first direction so as to sorb the impurities in the steam onto the bed of sorbent to remove the impurities from the steam and to produce a purified steam;

acting on pure water so as to produce a second purified steam having an increased solvent capacity for the impurities;

passing the second purified steam through the bed of sorbent in a second direction opposite the first direction so as to desorb the impurities from the bed of sorbent, producing a second impure steam containing the impurities;

acting on the second impure steam to form water containing the impurities; and recovering the water containing the impurities.

28. The process of claim 27, further comprising a step of monitoring the impure steam.

29. A process for separating at least one solute dissolved in a gaseous solvent from the gaseous solvent under conditions where a chemical potential of the at least one solute dissolved in the gaseous solvent decreases as a density of the gaseous solvent increases, the process comprising the steps of:

passing the gaseous solvent containing the at least one solute through a bed of sorbent in a first direction so as to sorb the at least one solute onto the bed of sorbent and to produce a purified gaseous solvent;

acting upon the purified gaseous solvent so as to increase the solvent capacity for the solute, producing an increased capacity gaseous solvent; and passing the increased capacity gaseous solvent through the bed of sorbent in a second direction opposite the first direction to produce a second gaseous solvent including the at least one solute.

30. The process according to claim 29, further comprising a step of recovering the at least one solute from the second gaseous solvent.

31. The process of claim 29, further comprising the step of recovering the purified gaseous solvent.

32. A process of separating a first solute of at least two solutes dissolved in a gaseous solvent under conditions where a chemical potential of the first solute of the at least two solutes dissolved in the gaseous solvent decreases as a density of the gaseous solvent increases, the process comprising the steps of:

passing the gaseous solvent containing the at least two solutes through a bed of sorbent in a first direction to sorb the first solute of the at least two solutes from the gaseous solvent, producing a first purified gaseous solvent;

collecting a second solute of the at least two solutes from the first purified gaseous solvent;

acting on the first purified gaseous solvent to increase its affinity for the first solute, producing an increased affinity gaseous solvent;

passing the increased affinity gaseous solvent through the bed of sorbent in a second direction opposite the first direction to desorb the first solute from the bed of sorbent to produce a second gaseous solvent.

33. The process according to claim 32, further comprising the step of recovering the first solute from the second gaseous solvent.

34. The process of claim 33, wherein the step of recovering the first solute from the second gaseous solute includes recovering water containing the impurities from the gaseous solute.

35. A process of purifying impure steam containing at least one impurity under conditions where a chemical potential of the at least one impurity in the steam decreases as a density of the steam increases, the process comprising the steps of:

passing the impure steam through a bed of sorbent in a first direction so as to remove the at least one of the impurities from the steam and to produce a purified steam;

increasing a solvent capacity for the at least one of the impurities to produce an increased affinity steam by acting on one selected from the group consisting of pure water and a portion of the purified steam; and passing the increased affinity steam through the bed of sorbent in a second direction opposite the first direction so as desorb the at least one impurity from the bed of sorbent.

* * * * *